(12) United States Patent
Takeda

(10) Patent No.: US 10,112,651 B2
(45) Date of Patent: Oct. 30, 2018

(54) VEHICLE BODY FRONT STRUCTURE

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 15/284,996

(22) Filed: Oct. 4, 2016

(65) Prior Publication Data

US 2017/0096169 A1 Apr. 6, 2017

(30) Foreign Application Priority Data

Oct. 5, 2015 (JP) ................................ 2015-197547

(51) Int. Cl.
| | |
|---|---|
| B62D 21/15 | (2006.01) |
| B62D 25/14 | (2006.01) |
| B62D 21/11 | (2006.01) |
| B62D 25/08 | (2006.01) |
| B62D 25/20 | (2006.01) |

(52) U.S. Cl.
CPC ............ *B62D 21/152* (2013.01); *B62D 21/11* (2013.01); *B62D 25/082* (2013.01); *B62D 25/145* (2013.01); *B62D 25/2018* (2013.01)

(58) Field of Classification Search
CPC .... B62D 21/152; B62D 21/11; B62D 25/145; B62D 25/082; B62D 25/2018
See application file for complete search history.

(56) References Cited

U.S. PATENT DOCUMENTS

2016/0059892 A1* 3/2016 Lee ...................... B62D 21/152
296/187.09

FOREIGN PATENT DOCUMENTS

JP 11-348813 A 12/1999

* cited by examiner

*Primary Examiner* — D Glenn Dayoan
*Assistant Examiner* — Melissa A Black
(74) *Attorney, Agent, or Firm* — Westerman, Hattori, Daniels & Adrian, LLP

(57) ABSTRACT

Front side frames and respective floor frames form upper horizontal portions, inclined portions, and lower horizontal portions. Each of the upper horizontal portions substantially horizontally extends. Each of the inclined portions is formed so as to extend rearward and so as to be inclined downward from a rear end of the upper horizontal portion. Each of the lower horizontal portions substantially horizontally extends rearward from a rear end of the inclined portion. A horizontal wall-shaped first reinforcing member extends rearward from the upper horizontal portion, and a vertical wall-shaped second reinforcing member extends from a rear end of the first reinforcing member to a bottom of the inclined portion. Front subframe supports that support the subframe are provided under triangular sectional portions formed by the inclined portion, the first reinforcing member and the second reinforcing member.

13 Claims, 10 Drawing Sheets

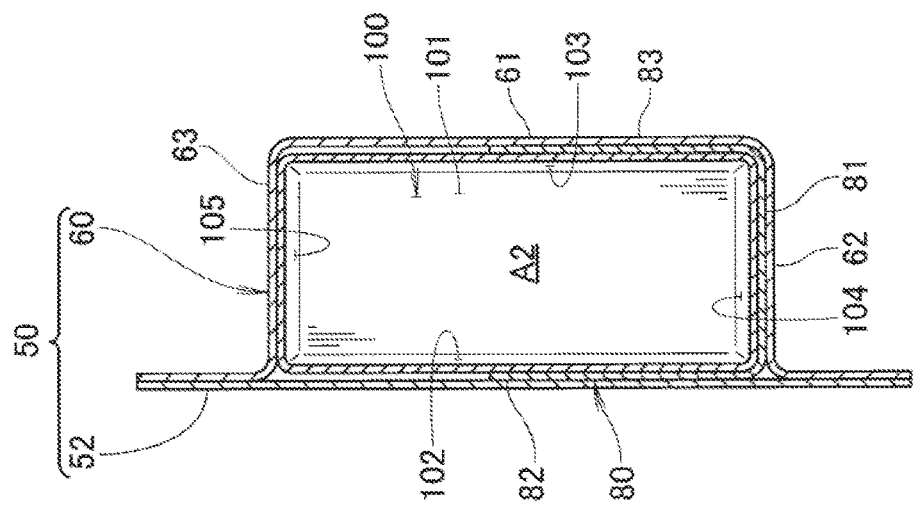
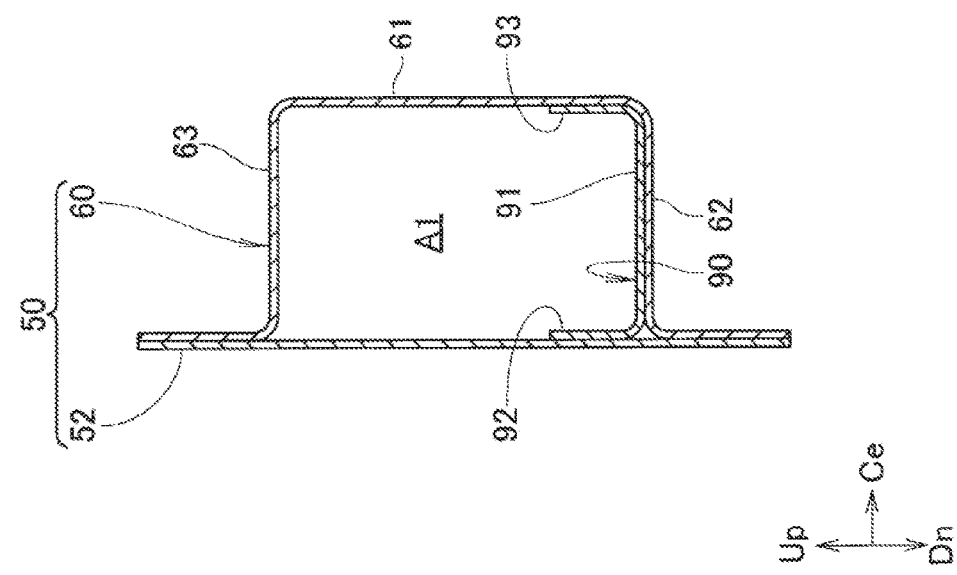

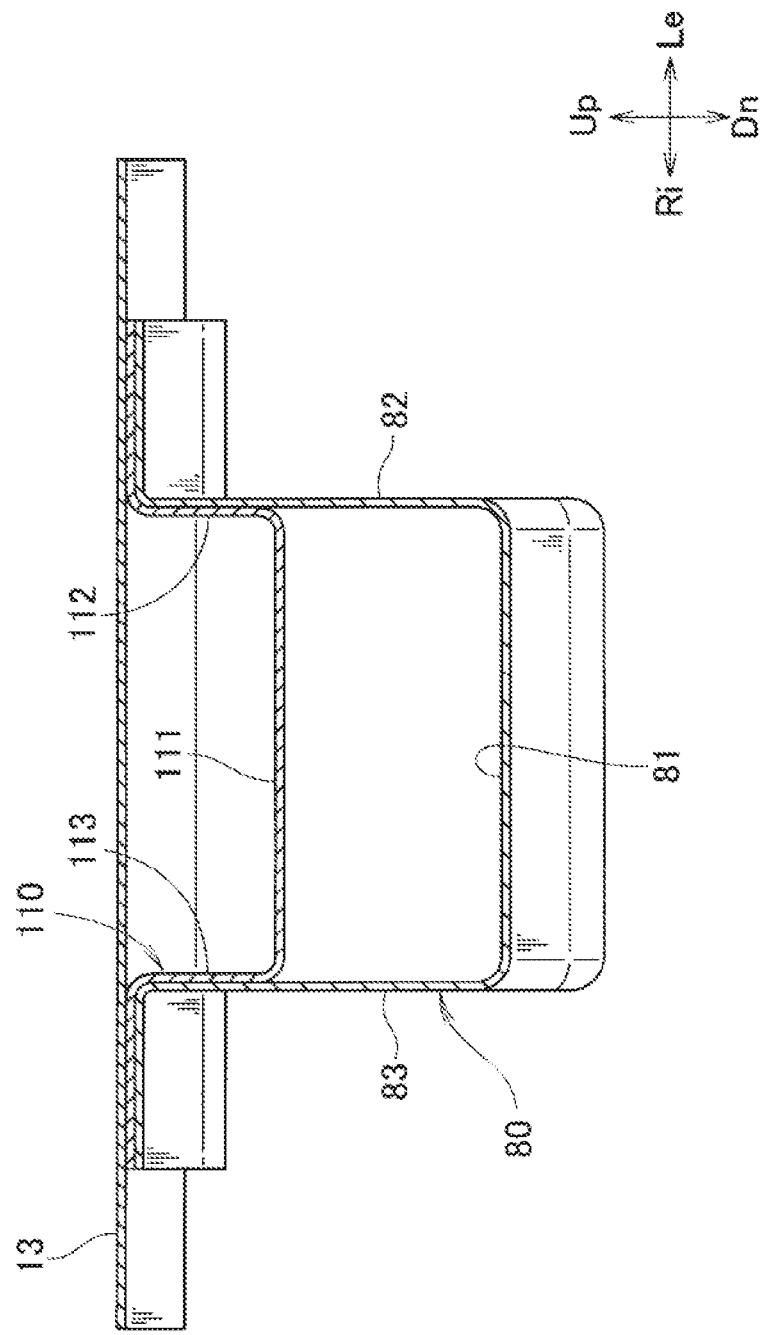

VEHICLE BODY FRONT STRUCTURE

CROSS REFERENCES TO RELATED APPLICATIONS

The present application claims priority under 35 U.S.C. § 119 to Japanese Patent Application No. 2015-197547, filed Oct. 5, 2015, entitled "Vehicle Body Front Structure." The contents of this application are incorporated herein by reference in their entirety.

TECHNICAL FIELD

The present disclosure relates to, for example, an improved vehicle body front structure.

BACKGROUND

As one of vehicle body front structures, the following structure is known: left and right front side frames extend in the front-rear direction of a vehicle, left and right floor frames continuous with the front side frames extend rearward, and a subframe is supported by these front side frames and the floor frames. Examples of related art relating to such a vehicle body front structure include a technique disclosed in Japanese Unexamined Patent Application Publication No. 11-348813.

In a vehicle body front structure as described in Japanese Unexamined Patent Application Publication No. 11-348813, frames form upper horizontal portions that substantially horizontally extend, inclined portions that extend rearward from rear ends of the upper horizontal portions so as to be inclined downward, and lower horizontal portions that substantially horizontally extend rearward from rear ends of the inclined portions. The inside of each of the frames is filled with foamed resin. In particular, the foamed resin is mainly filled into the inclined portions. Since the frames are filled with the foamed resin, when an impact is applied from the front side of the vehicle body, bending of the frames near the inclined portions can be suppressed.

However, with the vehicle body front structure according to Japanese Unexamined Patent Application Publication No. 11-348813, it is necessary to fill the foamed resin into the frames. This is a problem from the viewpoint of improving work efficiency during the assembly of the vehicle body.

SUMMARY

The present application describes, for example, a vehicle body with which deformation of the frames can be suppressed and which can be easily manufactured.

According to an aspect of the present application, a vehicle body front structure includes left and right front side frames, left and right floor frames, and a subframe. The left and right front side frames each have a closed sectional shape and each extend in a front-rear direction. The left and right floor frames are continuous with the left and right front side frames so as to extend rearward. The subframe is supported by the front side frames and the floor frames. Each of the front side frames and a corresponding one of the floor frames form an upper horizontal portion that substantially horizontally extends, an inclined portion that extends rearward from a rear end of the upper horizontal portion so as to be inclined downward, and a lower horizontal portion that substantially horizontally extends rearward from a rear end of the inclined portion. A boundary between the upper horizontal portion and the inclined portion is an upper curved portion having a curved shape. A boundary between the inclined portion and the lower horizontal portion is a lower curved portion having a curved shape. A horizontal wall-shaped first reinforcing member extends rearward from the upper horizontal portion. A vertical wall-shaped second reinforcing member extends from a rear end of the first reinforcing member to a bottom wall of the inclined portion. A triangular sectional portion having a triangular sectional shape in side view is formed near the upper curved portion by the inclined portion, the first reinforcing member, and the second reinforcing member.

When an impact is applied from the front side of the vehicle body, a large load is applied to the upper curved portion which is the border between the upper horizontal portion and the inclined portion. A portion that is likely to be subjected to such a load is reinforced by the horizontal wall-shaped first reinforcing member and the vertical wall-shaped second reinforcing member. Thus, deformation starting from the upper curved portion can be suppressed. In particular, deformation of the frame in the up-down direction is suppressed. Since deformation of the frame can be suppressed by two reinforcing members, the vehicle body can be easily manufactured.

Also according to the aspect of the present application, a front subframe support that supports the subframe is provided below the triangular sectional portion.

The subframe is supported at the triangular sectional portion the strength of which is increased by two reinforcing members. Thus, support rigidity of the subframe can be increased.

Preferably, a third reinforcing member that suppresses bending of the lower curved portion in an up-down direction is provided adjacent to the lower curved portion.

When an impact is applied from the front side of the vehicle body, a large load is applied to the lower curved portion which is the border between the inclined portion and the lower horizontal portion. A portion that is likely to be subjected to such a load is reinforced by the third reinforcing member. Thus, deformation starting from the lower curved portion can be suppressed. In particular, deformation of the frame in the up-down direction is suppressed. Deformation of the frame can be further suppressed.

Preferably, a sectional area of the inclined portion is larger than a sectional area of the upper horizontal portion in a section of the vehicle body seen in the front-rear direction, and an upper end of the second reinforcing member extends to a side-frame upper surface which is an upper surface of the front side frame.

When an impact is applied from the front side of the vehicle body, part of impact energy is input to the first reinforcing member and the second reinforcing member. Part of the impact energy input to the second reinforcing member is transmitted to the front side frame. The load applied to the upper curved portion can be reduced by dispersing the impact energy to the first reinforcing member, the second reinforcing member, and the front side frame. Thus, deformation of the frame starting from the upper curved portion can be suppressed.

Preferably, each of the floor frames has a substantially U shape that is open at a top thereof, and each of the floor frames includes a floor bottom portion and left and right floor side walls that respectively rise from a left side and a right side of the floor bottom portion. The second reinforcing member includes left and right second reinforcing side walls that extend rearward and that are connected to the floor side walls and a second reinforcing bottom portion that extends rearward and that is connected to the floor bottom portion.

Since the second reinforcing member is connected to the floor frame, the impact energy input to the second reinforcing member can be more reliably transmitted to the floor frame. Deformation of the frame starting from the upper curved portion can be suppressed by reliably dispersing the impact energy.

Preferably, the vehicle body front structure further includes a dashboard lower that defines a front of a vehicle cabin. Rear end portions of the front side frames are connected to the dashboard lower.

When an impact is applied from the front side of the vehicle body, the impact energy can be transmitted from the front side frame to the dashboard lower. Deformation of the frame can be suppressed by dispersing the impact energy.

Preferably, in the upper horizontal portion, a mount bracket that supports an engine or a transmission is attached at a position further to a front than a position where the first reinforcing member is disposed. A fragile portion a flexural rigidity of which is reduced compared to another portion so as to bend the upper horizontal portion outward in a vehicle width direction is formed in a portion between the mount bracket and the first reinforcing member.

When an impact is applied from the front side of the vehicle body, the upper horizontal portion can be bent starting from the fragile portion in the vehicle width direction. In so doing, part of the impact energy is absorbed by bending the upper horizontal portion in the vehicle width direction. The impact energy can be absorbed while effects on the vehicle cabin are suppressed by deforming in the horizontal direction a portion separated from the vehicle cabin.

Preferably, the subframe includes a front attachment at which the subframe is attached to the front subframe support, and the subframe is attached to the front subframe support with a front bolt, and the front attachment has a bolt hole through which the front bolt is inserted and a slit which extends outward in the vehicle width direction from the bolt hole.

When the upper horizontal portion is displaced in the horizontal direction, the front attachment is also displaced. The front attachment has the slit. When the bolt is displaced together with the front attachment, the bolt is displaced within the slit. When the amount of displacement of the front attachment and the bolt reaches a predetermined length, the subframe drops. Displacement of a heavy object mounted on the subframe to the vehicle cabin side can be suppressed.

Preferably, a dash cross-member that extends in a vehicle width direction is provided on a rear surface of the dashboard lower. Left and right end portions of the dash cross-member are positioned above the respective lower curved portions.

Part of the impact energy transmitted to the lower horizontal portion can be transmitted to the dash cross-member. The load applied to the lower curved portion can be reduced by dispersing the impact energy. Thus, deformation starting from the lower curved portion can be suppressed. In particular, deformation of the frame in the up-down direction is suppressed. The deformation of the frame can be further suppressed.

Preferably, a rear subframe support that supports the subframe is provided below the third reinforcing member. The rear subframe support includes a high-strength portion and a low-strength portion connected to a lower portion of the high-strength portion, and a strength with which the low-strength portion is attached is lower than a strength with which the high-strength portion is attached. The low-strength portion is provided with a rear nut. The subframe is supported by the rear nut and a rear bolt fastened to the rear nut.

When an impact is applied from the front side of the vehicle body, the low-strength portion is removed from the high-strength portion. This causes the subframe to drop. Displacement of a heavy object mounted on the subframe to the vehicle cabin side can be suppressed.

Preferably, the vehicle body front structure further includes an outrigger that is adjacent to the rear subframe support and that extends outward in a vehicle width direction from the lower horizontal portion.

The support rigidity of the subframe supported by the rear subframe support can be increased.

In the case where the vehicle body front structure includes the outrigger, a side sill extending in the front-rear direction is connected to an end portion of the outrigger in the vehicle width direction.

The impact energy transmitted to the lower horizontal portion can be transmitted to the outrigger and the side sill. The deformation of the frame can be suppressed by dispersing the impact energy.

BRIEF DESCRIPTION OF THE DRAWINGS

The advantages of the disclosure will become apparent in the following description taken in conjunction with the following drawings.

FIG. 7A is a sectional view taken along line VIIA-VIIA of FIG. 6, and FIG. 7B is a sectional view taken along line VIIB-VIIB of FIG. 6.

FIG. 8 is a sectional view taken along line VIII-VIII of FIG. 6.

DETAILED DESCRIPTION

Figure 1:
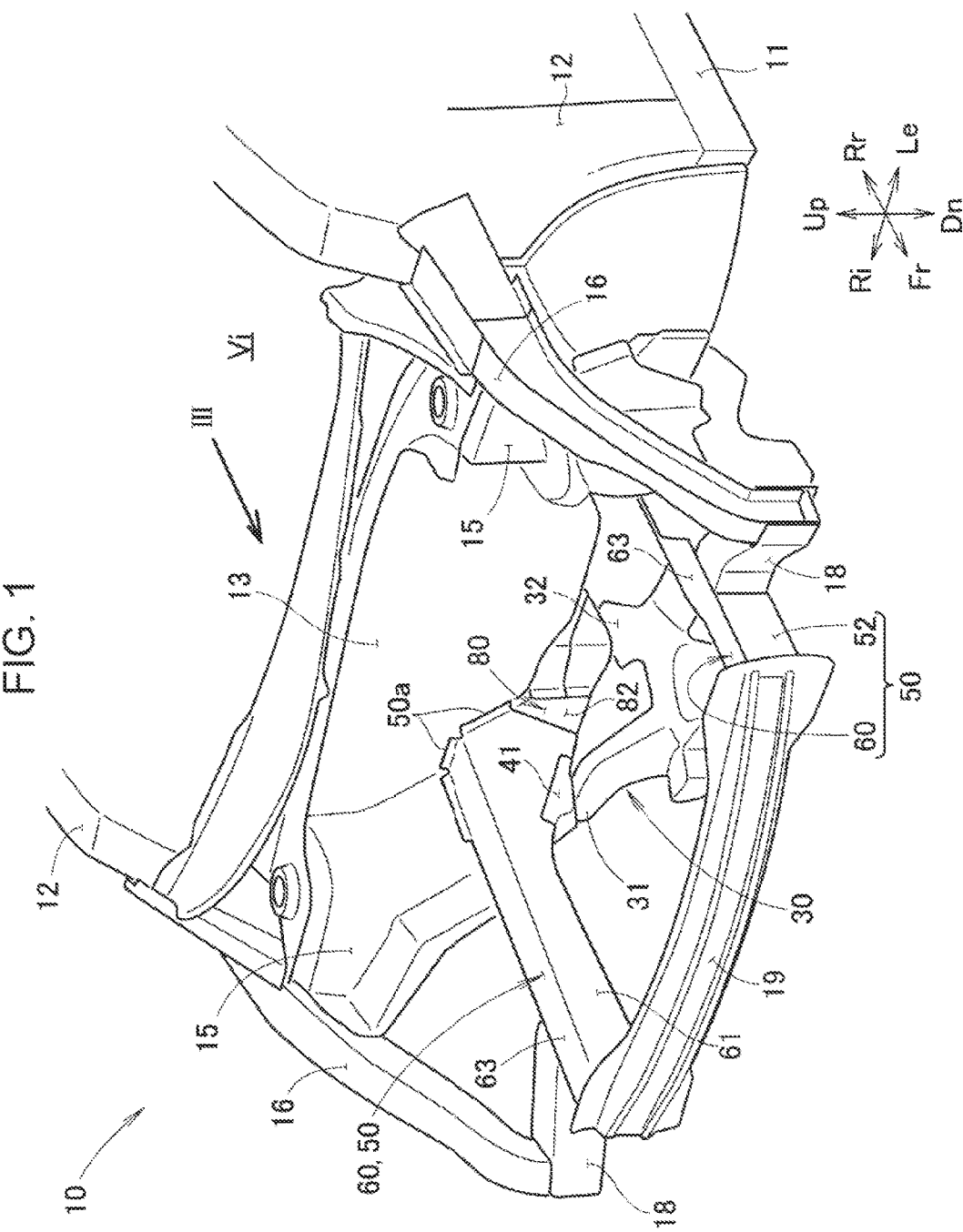
FIG. 1 is a perspective view of a vehicle body according to an embodiment to which a vehicle body front structure according to the present application is applied.

An embodiment of the present application will be described below with reference to the accompanying drawings. In the following description, "left" and "right" respectively refer to the left and the right with reference to an occupant of a vehicle, and "front" and "rear" respectively refer to the front and the rear with reference to the travel direction of the vehicle. Furthermore, in the drawing, "Fr" and "Rr" respectively represent the front and the rear, "Le" and "Ri" respectively represent the left and the right seen from the occupant, "Ce" represents the center of the width of the vehicle, and "Up" and "Dn" respectively represent the upper side and the lower side.

Embodiment

Referring first to FIG. 1, a front portion of a vehicle body when the vehicle is seen in an inclined direction from the front left is illustrated. A vehicle body 10 is substantially mirror symmetrical about the center of the vehicle width.

The vehicle body 10 includes the following components: left and right side sills 11 that extend in a front-rear direction at end portions in the vehicle width direction (only the left side sill 11 is illustrated); left and right front pillars 12 that respectively rise from front portions of the left and right side sills 11; a dashboard lower 13 that spans between the left and right front pillars 12 so as to define the front of a vehicle cabin Vi; left and right front side frames 50 that respectively extend from left and right end portions of the dashboard lower 13 toward the front of the vehicle body; left and right damper housings 15 that respectively rise from the left and right side front side frames 50 in front of the front pillars 12; left and right upper members 16 that respectively extend from the left and right front pillars 12 toward the front of the vehicle body through the damper housings 15; and a subframe 30 provided between the left and right front side frames 50.

The vehicle body 10 also includes the following components: left and right gussets 18 that respectively connect front ends of the left and right upper members 16 to front portions of the left and right front side frames 50; and a bumper beam 19 that spans between front ends of the left and right front side frames 50.

Figure 2:
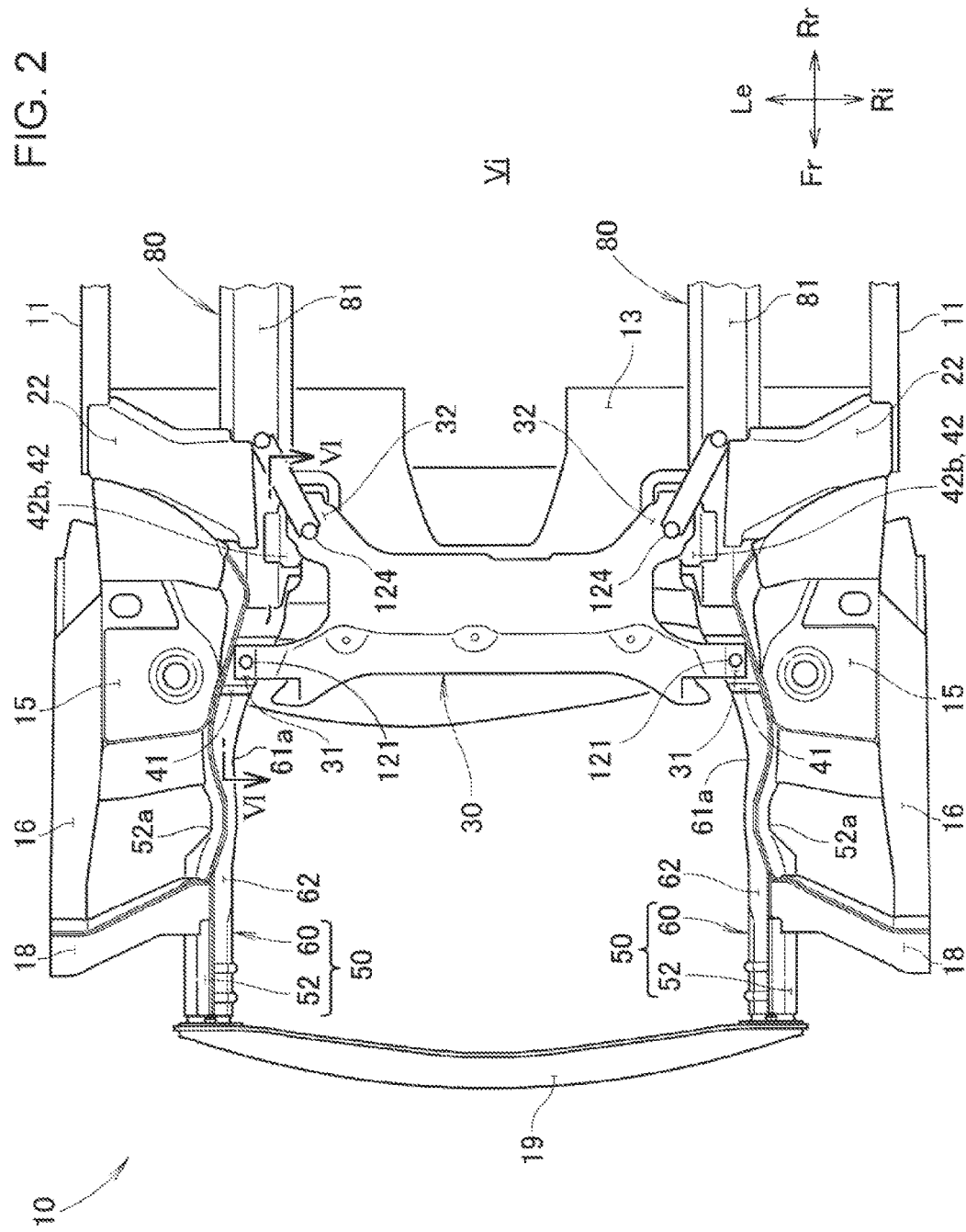
FIG. 2 is a bottom view of the vehicle body of FIG. 1.

Referring to FIG. 2, the vehicle body 10 seen from below is illustrated. Accordingly, the upper side of FIG. 2 is the left side of the vehicle body and the lower side of FIG. 2 is the right side of the vehicle body. Left and right floor frames 80 which are respectively continuous with the left and right front side frames 50 and extend rearward. Left and right outriggers 22 respectively extend from the left and right floor frames 80 outward in the vehicle width direction. End portions of the left and right outriggers 22 on the outer sides in the vehicle width direction are respectively connected to the left and right side sills 11.

The subframe 30 is supported by the left and right front side frames 50 and the left and right floor frames 80. More specifically, the subframe 30 includes left and right front attachments 31 and the left and right rear attachments 32. The left and right front attachments 31 are formed on the left and right on the front side of the subframe 30 and attached to the front side frames 50. The left and right rear attachments 32 are formed on the left and right on the rear side of the subframe 30 and attached to the floor frames 80.

The left and right front attachments 31 are respectively attached to left and right front subframe supports 41 provided on lower surfaces of the front side frames 50. The left and right rear attachments 32 are respectively attached to left and right rear subframe supports 42 provided on lower surfaces of the floor frames 80.

Figure 3:
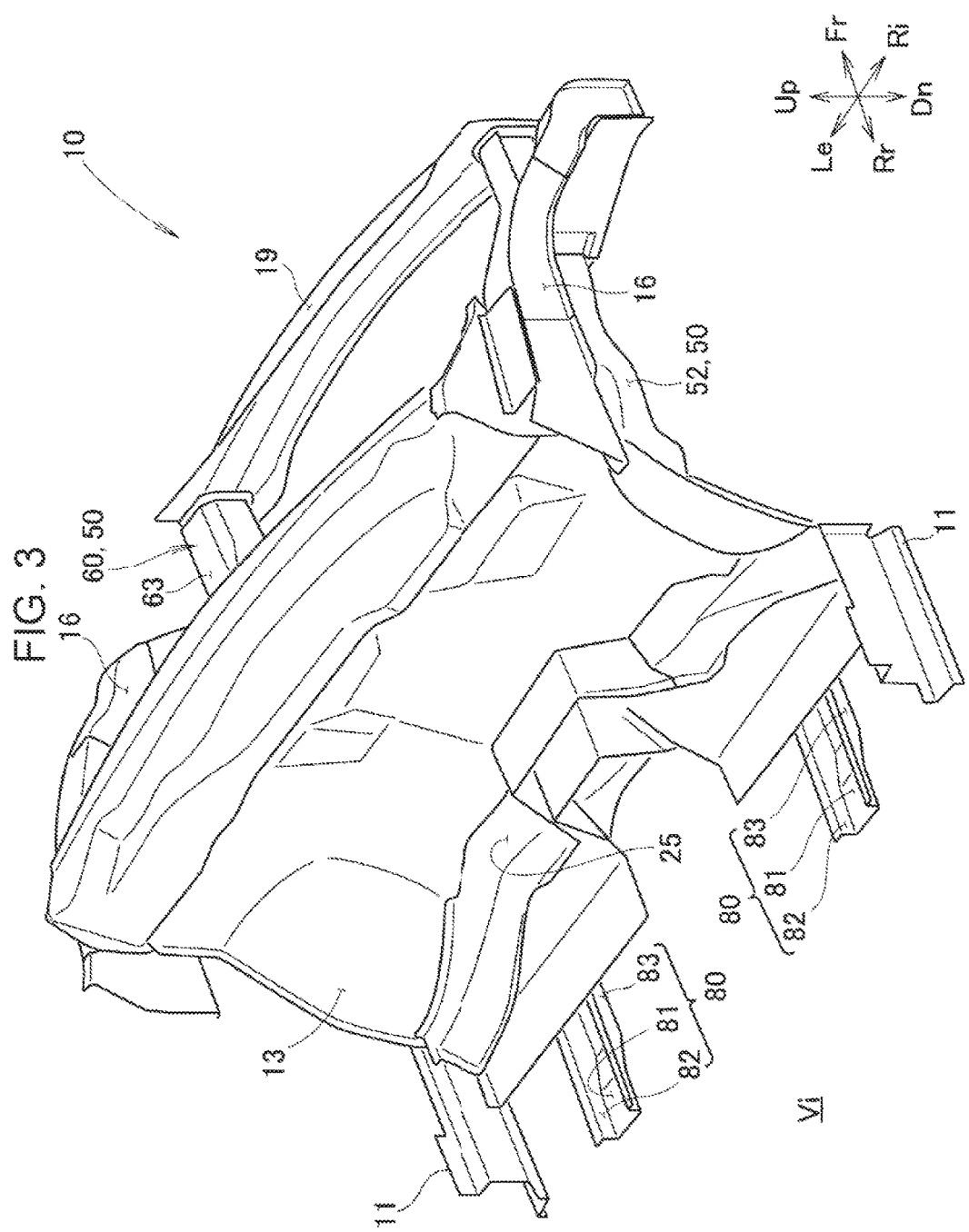
FIG. 3 is a view seen in an arrow III direction of FIG. 1.

Referring to FIG. 3, a dash cross-member 25 that extends in the vehicle width direction is provided on a rear surface of the dashboard lower 13.

The left and right floor frames 80 each have a substantially U shape that is open at its top. A floor panel is mounted on upper surfaces of the floor frames 80.

Figure 4:
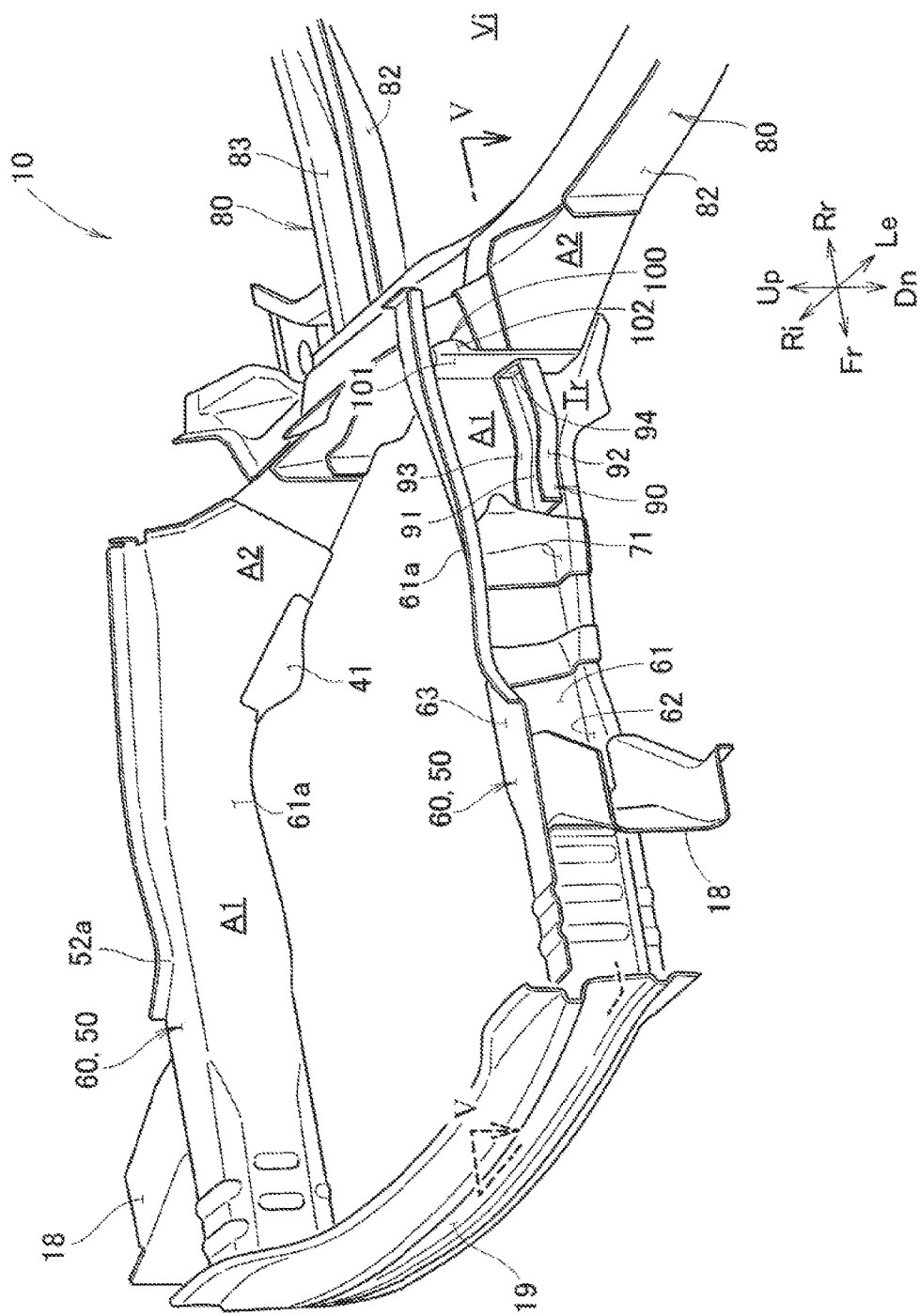
FIG. 4 is a perspective view illustrating left and right front side frames, left and right floor frames, and a bumper beam of FIG. 1.
Figure 5:
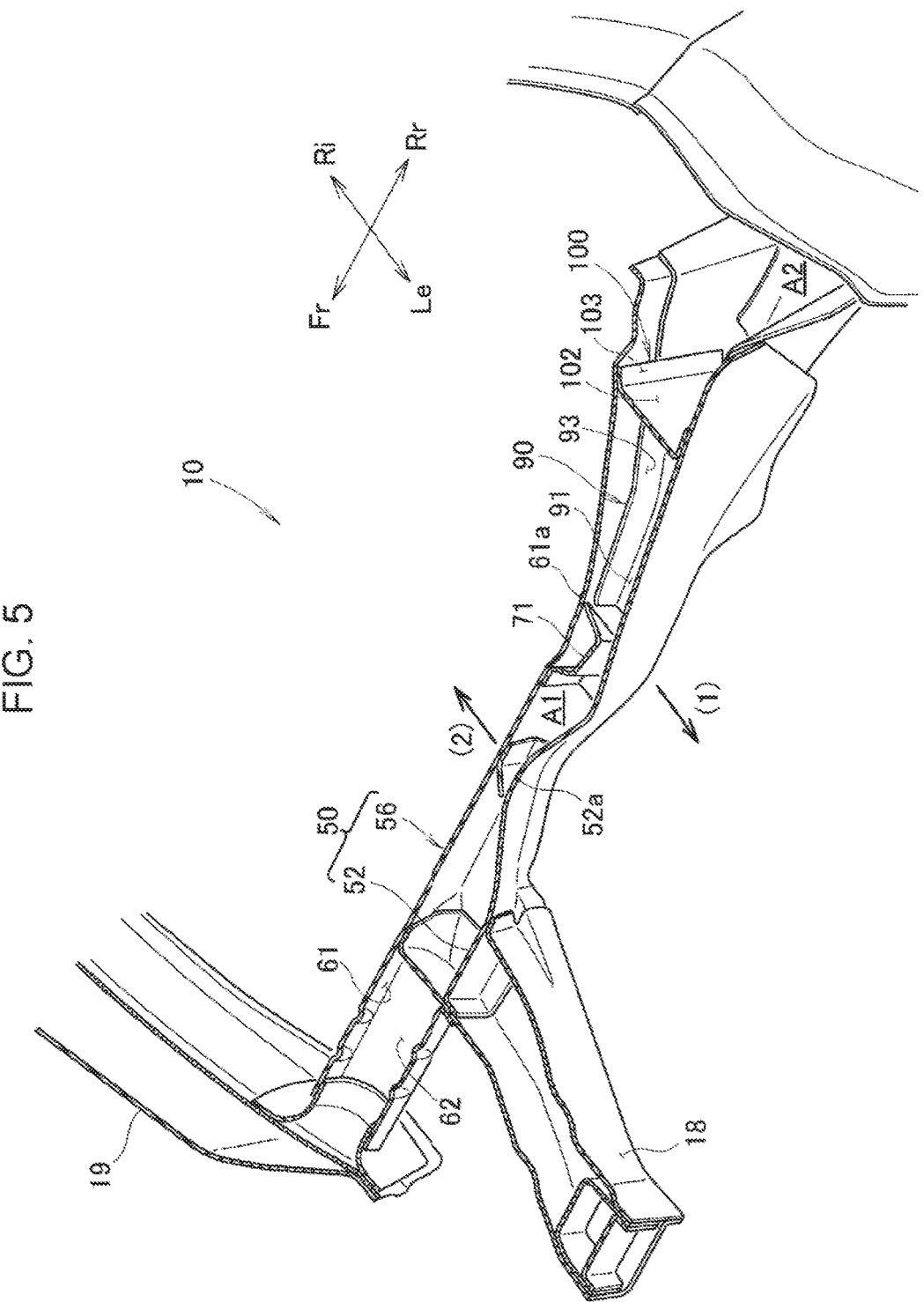
FIG. 5 is a sectional view taken along line V-V of FIG. 4.

Referring to FIGS. 4 and 5, the left side of the vehicle body 10 will be described. A basic structure on the right side of the vehicle body 10 is similar to that on the left side. Thus, description of the right side of the vehicle body 10 is omitted.

The front side frame 50 includes a side frame inner 60 and a side frame outer 52. The side frame inner 60 has a substantially U shape that is open outward in the vehicle width direction. The side frame outer 52 is provided on the outer side in the vehicle width direction so as to close the opening of the side frame inner 60. Due to covering of the side frame inner 60 by the side frame outer 52, the front side frame 50 has a closed sectional shape.

Referring to FIG. 4, the side frame inner 60 includes a side-frame side wall 61, a side-frame bottom 62, and a side-frame upper surface 63. The side-frame side wall 61 extends in the front-rear direction near the center of the vehicle width. The side-frame bottom 62 extends outward in the vehicle width direction from a lower end of the side-frame side wall 61. The side-frame upper surface 63 extends outward in the vehicle width direction from an upper end of the side-frame side wall 61.

The side-frame bottom 62 substantially horizontally extends rearward from a front end and a rear portion of the side-frame bottom 62 is inclined downward.

Referring to FIG. 5, a mount bracket 71 that supports an engine or a transmission is attached to the side-frame side wall 61 of the side frame inner 60.

The side frame inner 60 straightly extends in the vehicle front-rear direction from a front end thereof to a portion where the mount bracket 71 is provided. On the rear side from the portion where the mount bracket 71 is provided, the side frame inner 60 extends rearward while being inclined inward in the vehicle width direction.

A boundary between an straightly extending portion of the side frame inner 60 and an obliquely extending portion of the side frame inner 60 in the vehicle front-rear direction is referred to as an inner fragile portion 61a (fragile portion 61a). The inner fragile portion 61a is a portion where the side frame inner 60 is deformed and stress is likely to concentrate. The flexural rigidity is lower in the inner fragile portion 61a than in portions in front of and behind the inner fragile portion 61a. When an impact is applied from the front side of the vehicle body, the front side frame 50 is bent in the horizontal direction with the inner fragile portion 61a as a break point. As illustrated by an arrow (1), the front side frame 50 is bent such that the inner fragile portion 61a projects outward in the vehicle width direction.

The side frame outer 52 includes an outer fragile portion 52a that is bent inward in the vehicle width direction. The side frame outer 52 other than the outer fragile portion 52a straightly extends in the vehicle front-rear direction. The outer fragile portion 52a is a portion where the side frame outer 52 is deformed and stress is likely to concentrate. The flexural rigidity is lower in the outer fragile portion 52a than in portions in front of and behind the outer fragile portion 52a. When an impact is applied from the front side of the vehicle body, the front side frame 50 is bent in the horizontal direction with the outer fragile portion 52a as a break point. As illustrated by an arrow (2), the front side frame 50 is bent such that the outer fragile portion 52a projects toward the center in the vehicle width direction.

Referring to FIG. 3, the floor frame 80 having a substantially U-shaped section includes a floor bottom 81 and left and right floor side walls 82 and 83 that respectively rise from the left side and the right side of the floor bottom 81.

Figure 6:
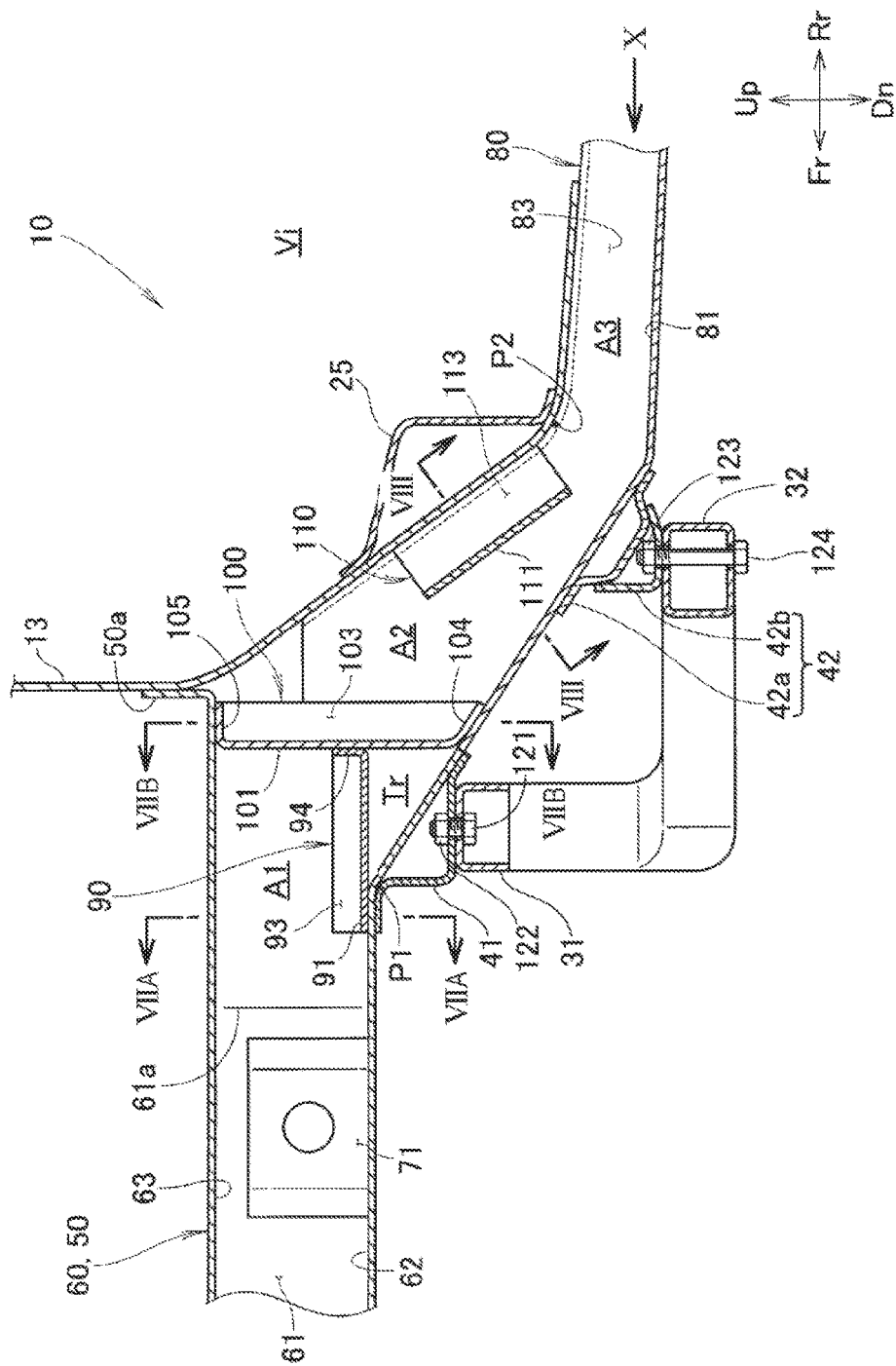
FIG. 6 is a sectional view taken along line VI-VI of FIG. 2.

Referring to FIG. 6, a rear end portion 50a of the front side frame 50 is joined to the dashboard lower 13.

The front side frame 50 and the floor frame 80 are continuous with each other in the front-rear direction. The front side frame 50 and the floor frame 80 form an upper horizontal portion A1, an inclined portion A2, and a lower horizontal portion A3. The upper horizontal portion A1 substantially horizontally extends. The inclined portion A2 is formed so as to extend rearward and so as to be inclined downward from a rear end of the upper horizontal portion A1. The lower horizontal portion A3 substantially horizontally extends rearward from a rear end of the inclined portion A2.

The upper horizontal portion A1 includes the front side frame 50. According to the present embodiment, it can be said that the upper horizontal portion A1 is, in other words, the front side frame 50.

The lower horizontal portion A3 includes the floor frame 80. According to the present embodiment, it can be said that the lower horizontal portion A3 is, in other words, the floor frame 80.

The inclined portion A2 includes part of the front side frame 50 and part of the floor frame 80. In other words, the front side frame 50 and the floor frame 80 are connected to each other in the inclined portion A2.

A boundary between the upper horizontal portion A1 and the inclined portion A2 is curved. This portion is referred to as an upper curved portion P1. A boundary between the inclined portion A2 and the lower horizontal portion A3 is curved. This portion is referred to as a lower curved portion P2.

A horizontal wall-shaped first reinforcing member 90 extends rearward from the side-frame bottom 62 included in the upper horizontal portion A1. A vertical wall-shaped second reinforcing member 100 extends from a rear end of the first reinforcing member 90. A third reinforcing member 110 that suppresses bending of the lower curved portion P2 in the up-down direction is provided near the lower curved portion P2.

The mount bracket 71 is attached at a position further to the front than a position where the first reinforcing member 90 is disposed. The inner fragile portion 61a is formed between the mount bracket 71 and the first reinforcing member 90.

A triangular sectional portion Tr having a triangular sectional shape in side view is formed near the upper curved portion P1 by the inclined portion A2 (side-frame bottom 62), the first reinforcing member 90, and the second reinforcing member 100. The front subframe support 41 is provided on a lower portion of the triangular section portion Tr.

The rear subframe support 42 is provided below the dash cross-member 25 and the third reinforcing member 110.

Also referring to FIG. 7A, the first reinforcing member 90 includes a first reinforcing bottom 91, first reinforcing side walls 92 and 93, and a first reinforcing rear wall 94. The first reinforcing bottom 91 is joined to the side-frame bottom 62. The first reinforcing side walls 92 and 93 rise from the left and right sides of the first reinforcing bottom 91. The first reinforcing rear wall 94 spans between rear ends of the first reinforcing side walls 92 and 93 and rises from the first reinforcing bottom 91.

Referring FIGS. 6 and 7B, the second reinforcing member 100 has a bulkhead shape that closes the inside of the inclined portion A2. The second reinforcing member 100 includes the following portions: a second reinforcing bottom 101 that extends in the up-down direction and is joined to the first reinforcing rear wall 94; second reinforcing side walls 102 and 103 that extend rearward from the left and right sides of the second reinforcing bottom 101; a second reinforcing lower wall 104 that spans between lower ends of the second reinforcing side walls 102 and 103 and extends rearward from the second reinforcing bottom 101; and a second reinforcing upper wall 105 that spans between upper ends of the second reinforcing side walls 102 and 103 and extends rearward from the second reinforcing bottom 101.

The second reinforcing lower wall 104 is joined to the floor bottom 81. In other words, the second reinforcing member 100 extends to the bottom of the inclined portion A2. The second reinforcing side walls 102 and 103 are joined to the floor side walls 82 and 83. The second reinforcing upper wall 105 is joined to the side-frame upper surface 63.

Referring to FIGS. 7A and 7B, the sectional area of the inclined portion A2 is larger than the sectional area of the upper horizontal portion A1 in a section of the vehicle body seen in the front-rear direction. More specifically, whereas the width of the upper horizontal portion A1 and the width of the inclined portion A2 are substantially the same in the vehicle width direction, the height of the inclined portion A2 is larger than the height of the upper horizontal portion A1. Thus, the sectional area of the inclined portion A2 is larger than the sectional area of the upper horizontal portion A1.

Referring to FIG. 8, the floor frame 80, the third reinforcing member 110, and the dashboard lower 13 seen from the front are illustrated. Accordingly, the left side of FIG. 8 is the right side of the vehicle body and the right side of FIG. 8 is the left side (center in the vehicle width) of the vehicle body.

The third reinforcing member 110 has a substantially U shape that is open at its top. The third reinforcing member 110 includes a third reinforcing bottom 111 and third reinforcing side walls 112 and 113. The third reinforcing bottom 111 spans between the left and right floor side walls 82 and 83. The third reinforcing side walls 112 and 113 rise from the left and right sides of the third reinforcing bottom 111 and extend along the floor side walls 82 and 83. The third reinforcing member 110 closes the upper surface of the floor frame 80. The upper surface of the third reinforcing member 110 is closed by the dashboard lower 13. A substantially rectangular closed section is formed by the third reinforcing member 110 and the dashboard lower 13.

Figure 9:
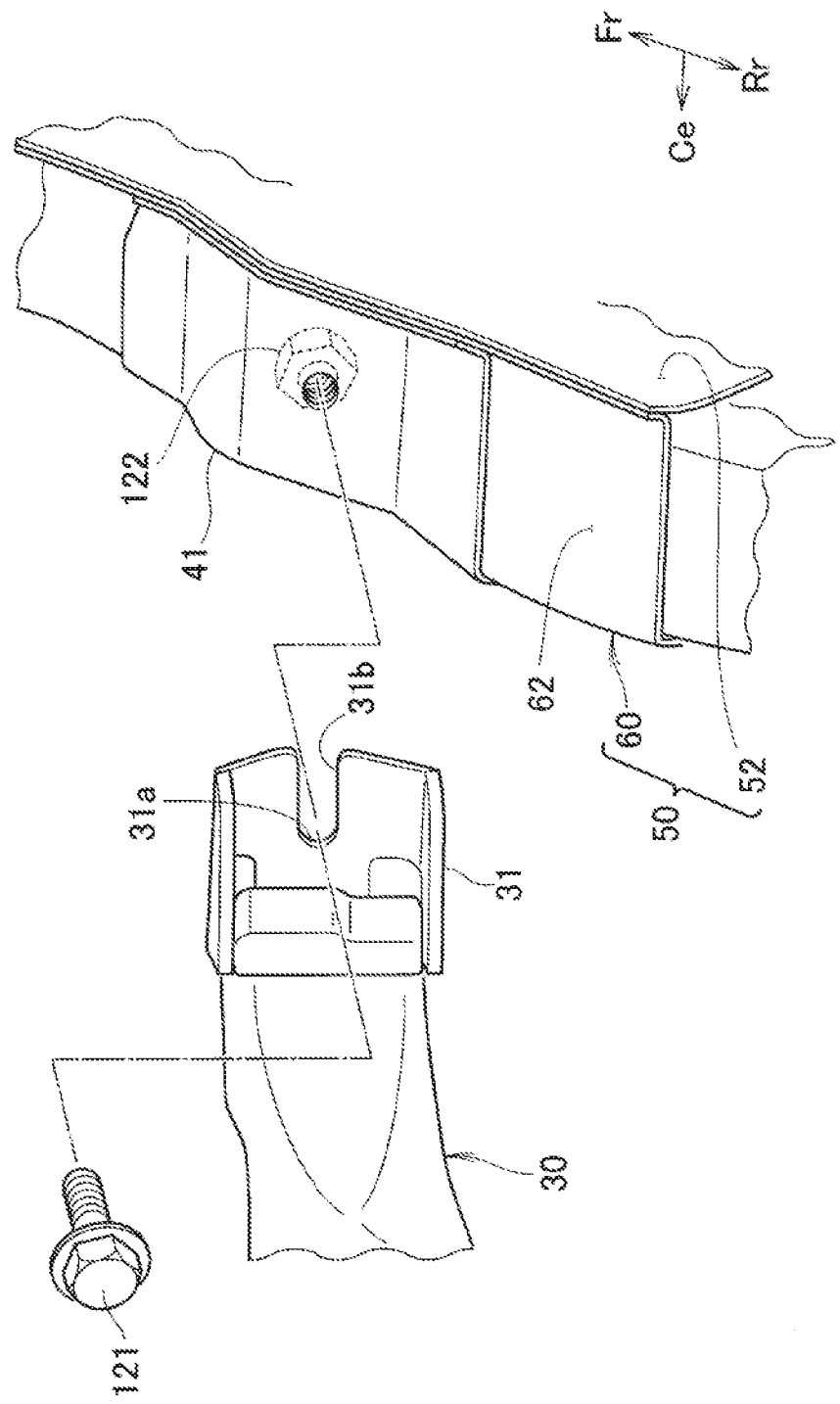
FIG. 9 is an exploded perspective view illustrating a structure with which a front attachment of FIG. 2 is attached to a front subframe support.

Referring to FIG. 9, the front side frame 50 and the front attachment 31 of the subframe 30 seen from below are illustrated. Accordingly, the right side of FIG. 9 is the left side of the vehicle body and the left side of FIG. 9 is the right side (center in the vehicle width) of the vehicle body.

The front attachment 31 of the subframe 30 includes a bolt hole 31a through which a front bolt 121 is inserted and a slit 31b that has a slit shape extending from the bolt hole 31a to an outer end portion in the vehicle width direction. The bolt hole 31a and the slit 31b are continuous with each other so as to have a substantially U shape.

The front bolt 121 is fastened to a front nut 122 joined to the front subframe support 41. The front attachment 31 is supported by the front bolt 121 and the front nut 122.

Figure 10:
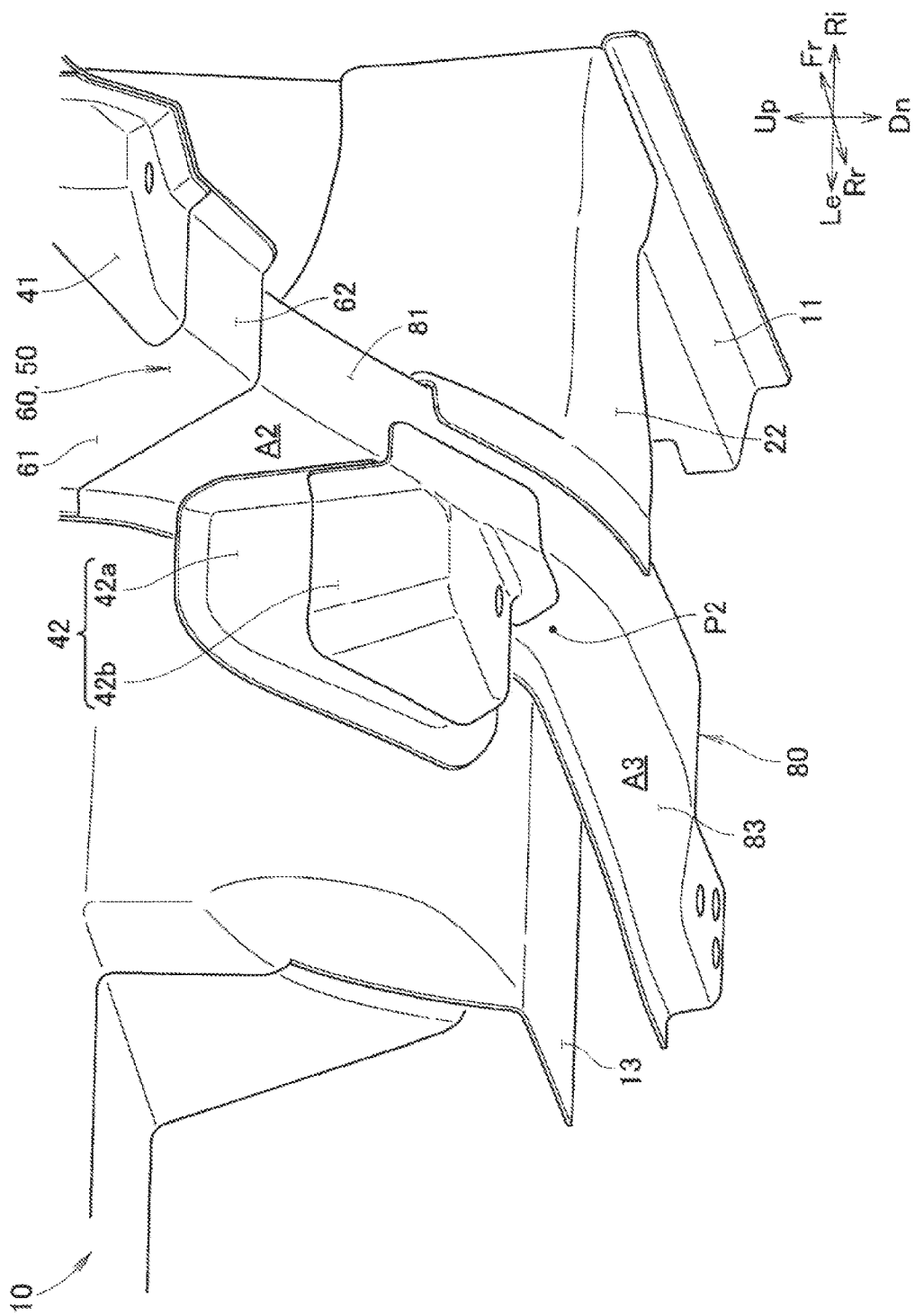
FIG. 10 is a view seen in an arrow X direction of FIG. 6.

Referring to FIG. 10, the floor frame 80 and the rear subframe support 42 seen from the rear are illustrated. Accordingly, the right side of FIG. 10 is the right side of the vehicle body and the left side of FIG. 10 is the left side (center in the vehicle width) of the vehicle body.

The rear subframe support 42 includes a high-strength portion 42a and a low-strength portion 42b. The low-strength portion 42b is connected to a lower portion of the high-strength portion 42a. The strength with which the low-strength portion 42b is attached is lower than that with which the high-strength portion 42a is attached.

Referring to FIG. 6, a rear nut 123 is joined to the low-strength portion 42b. The rear attachment 32 of the subframe 30 is supported by the rear nut 123 and a rear bolt 124 fastened to this rear nut 123.

Effects produced according to the present application having been described are as follows.

Referring to FIG. 6, near the upper curved portion P1 which is the boundary between the upper horizontal portion A1 and the inclined portion A2, the triangular sectional portion Tr having a triangular sectional shape in side view is formed by the inclined portion A2, the first reinforcing member 90, and the second reinforcing member 100. When an impact is applied from the front side of the vehicle body, a large load is applied to the upper curved portion P1 which is the border between the upper horizontal portion A1 and the inclined portion A2. A portion that is likely to be subjected to such a load is reinforced by the horizontal wall-shaped first reinforcing member 90 and the vertical wall-shaped second reinforcing member 100. Thus, deformation starting from the upper curved portion P1 can be suppressed. In particular, deformation of the front side frame 50 in the up-down direction is suppressed. Since the deformation of the front side frame 50 can be suppressed by two reinforcing members 90 and 100, the vehicle body 10 can be easily manufactured.

Furthermore, the front subframe support 41 that supports the subframe 30 is provided below the triangular sectional portion Tr. The subframe 30 is supported below the triangular sectional portion Tr the strength of which is increased by two reinforcing members 90 and 100. Thus, support rigidity of the subframe 30 can be increased.

Furthermore, the third reinforcing member 110 that suppresses bending of the lower curved portion P2 in the up-down direction is provided near the lower curved portion P2. When an impact is applied from the front side of the vehicle body, a large load is applied to the lower curved portion P2 which is the border between the inclined portion A2 and the lower horizontal portion A3. A portion that is likely to be subjected to such a load is reinforced by the third reinforcing member 110. Thus, deformation starting from the lower curved portion P2 can be suppressed. In particular, deformation of the floor frame 80 in the up-down direction is suppressed. The deformation of the floor frame 80 can be further suppressed.

Furthermore, an upper end of the second reinforcing member 100 extends to the side-frame upper surface 63 which is an upper surface of the front side frame 50. When an impact is applied from the front side of the vehicle body, part of impact energy is input to the first reinforcing member 90 and the second reinforcing member 100. Part of the impact energy input to the second reinforcing member 100 is transmitted to the front side frame 50. The load applied to the upper curved portion P1 can be reduced by dispersing the impact energy to the first reinforcing member 90, the second reinforcing member 100, and the front side frame 50. Thus, deformation of the front side frame 50 starting from the upper curved portion P1 can be suppressed.

Referring also to FIG. 7B, the second reinforcing member 100 includes the left and right second reinforcing side walls 102 and 103 and the second reinforcing bottom 101. The second reinforcing side walls 102 and 103 extend rearward and are connected to the floor side walls 82 and 83. The second reinforcing bottom 101 extends rearward and connected to the floor bottom 81. Since the second reinforcing member 100 is joined to the floor frame 80, the impact energy input to the second reinforcing member 100 can be more reliably transmitted to the floor frame 80. The deformation of the front side frame 50 starting from the upper curved portion P1 can be suppressed by reliably dispersing the impact energy.

Referring to FIG. 6, the rear end portion 50a of the front side frame 50 is connected to the dashboard lower 13. When an impact is applied from the front side of the vehicle body, the impact energy can be transmitted from the front side frame 50 to the dashboard lower 13. The deformation of the front side frame 50 can be suppressed by dispersing the impact energy.

Referring to FIG. 5, The inner fragile portion 61a is formed between the mount bracket 71 and the first reinforcing member 90 in the upper horizontal portion A1. The flexural rigidity of the inner fragile portion 61a is reduced compared to other portions so as to bend the upper horizontal portion A1 outward in the vehicle width direction. When an impact is applied from the front side of the vehicle body, the upper horizontal portion A1 can be bent outward starting from the inner fragile portion 61a in the vehicle width direction. In so doing, part of the impact energy is absorbed by bending the upper horizontal portion A1 outward in the vehicle width direction. The impact energy can be absorbed while effects on the vehicle cabin are suppressed by deforming in the horizontal direction a portion separated from the vehicle cabin.

Referring to FIG. 9, the front attachment 31 has the bolt hole 31a through which the front bolt 121 is inserted and the slit 31b that extends outward from the bolt hole 31a in the vehicle width direction. When the upper horizontal portion A1 is displaced in the horizontal direction, the front attachment 31 is also displaced. The front attachment 31 has the slit 31b. When the front bolt 121 is displaced together with the front attachment 31, the front bolt 121 is displaced within the slit 31b. When the amount of displacement of the front attachment 31 and the front bolt 121 reaches a predetermined length, the subframe 30 drops. Displacement of a heavy object mounted on the subframe 30 to the vehicle cabin side Vi can be suppressed.

Referring to FIG. 6, an end portion of the dash cross-member 25 is positioned above the lower curved portion P2. Part of the impact energy transmitted to the lower horizontal portion A3 can be transmitted to the dash cross-member 25. The load applied to the lower curved portion P2 can be reduced by dispersing the impact energy. Thus, deformation starting from the lower curved portion P2 can be suppressed. In particular, deformation of the floor frame 80 in the up-down direction is suppressed. The deformation of the floor frame 80 can be further suppressed.

Referring also to FIG. 10, the rear subframe support 42 includes the high-strength portion 42a and the low-strength portion 42b. The low-strength portion 42b is connected to the lower portion of the high-strength portion 42a. The subframe 30 is supported by the rear nut 123 provided in the low-strength portion 42b and the rear bolt 124 fastened to this rear nut 123. When an impact is applied from the front side of the vehicle body, the low-strength portion 42b is removed from the high-strength portion 42a. This causes the subframe 30 to drop. Displacement of a heavy object mounted on the subframe 30 to the vehicle cabin side Vi can be suppressed.

Referring to FIGS. 2 and 6, the outrigger 22 that extends outward in the vehicle width direction from the lower horizontal portion A3 is provided. The side sill 11 extending in the front-rear direction is connected to the end portion of the outrigger 22 in the vehicle width direction. The impact energy transmitted to the lower horizontal portion A3 can be transmitted to the outrigger 22 and the side sill 11. The deformation of the floor frame 80 can be suppressed by dispersing the impact energy.

Furthermore, the outrigger 22 to which the side sill 11 is connected is adjacent to the rear subframe support 42. The support rigidity of the subframe 30 supported by the rear subframe support 42 can be increased.

Referring to FIG. 5, the front side frame 50 (upper horizontal portion A1) also includes the outer fragile portion 52a. The flexural rigidity of the outer fragile portion 52a is reduced compared to other portions so as to bend the front side frame 50 outward in the vehicle width direction. The outer fragile portion 52a is positioned in front of the mount bracket 71. Two fragile portions 52a and 61a are starting points for bending in opposite vehicle width directions. When the front side frame 50 is bent, the mount bracket 71 provided between the fragile portions 52a and 61a can be reliably removed from the engine or the transmission. Thus, displacement of a heavy object, that is, the engine or the transmission, to the vehicle cabin side can be suppressed.

Although the boundary between the front side frame and the floor frame is positioned at the inclined portion according to the present embodiment, the boundary between these may be position in another portion. For example, the entirety of the inclined portion can be formed by the floor frame. That is, the present application is not limited to the embodiment as long as operations of the present application are performed and the effects of the present application are produced.

For example, the vehicle body front structure according to the embodiment is preferable for a vehicle body structure of a passenger vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body front structure comprising:
   left and right front side frames that each have a closed sectional shape and that each extend in a front-rear direction;
   left and right floor frames that continuously extend rearward from the left and right front side frames, respectively, and
   a subframe supported by the front side frames and the floor frames,
   wherein each of the front side frames and a corresponding one of the floor frames constitute an upper horizontal portion that substantially horizontally extends, an inclined portion that extends rearward from a rear end of the upper horizontal portion so as to be inclined downward, and a lower horizontal portion that substantially horizontally extends rearward from a rear end of the inclined portion,
   wherein a boundary between the upper horizontal portion and the inclined portion is an upper curved portion having a curved shape,
   wherein a boundary between the inclined portion and the lower horizontal portion is a lower curved portion having a curved shape,
   wherein a horizontal wall-shaped first reinforcing member extends rearward from the upper horizontal portion,
   wherein a vertical wall-shaped second reinforcing member extends from a rear end of the first reinforcing member to a bottom wall of the inclined portion,
   wherein the bottom wall of the inclined portion, the first reinforcing member, and the second reinforcing member constitute a triangular sectional portion having a triangular sectional shape in side view in the vicinity of the upper curved portion,
   wherein the vehicle body front structure further comprises a front subframe support that supports the subframe under the triangular sectional portion, and
   wherein the first reinforcing member substantially horizontally extends rearward from a bottom wall of the upper horizontal portion.

2. The vehicle body front structure according to claim 1, wherein a third reinforcing member that suppresses bending of the lower curved portion in an up-down direction is provided adjacent to the lower curved portion.

3. The vehicle body front structure according to claim 1, wherein a cross sectional area of the inclined portion is larger than a cross sectional area of the upper horizontal portion, and
   wherein an upper end of the second reinforcing member extends to a side-frame upper wall of the front side frame.

4. The vehicle body front structure according to claim 1, wherein each of the floor frames has a substantially U shape that is open at a top thereof, and that comprises a floor bottom portion, and
   left and right floor side walls that respectively rise from a left side and a right side of the floor bottom portion, and
   wherein the second reinforcing member includes
   left and right second reinforcing side walls that extend rearward and that are connected to the floor side walls, respectively and
   a second reinforcing bottom portion that extends rearward and that is connected to the floor bottom portion.

5. The vehicle body front structure according to claim 1, further comprising:
   a dashboard lower that partitions a front of a vehicle cabin,
   wherein rear end portions of the front side frames are connected to the dashboard lower, respectively.

6. The vehicle body front structure according to claim 1, wherein the upper horizontal portion includes a mount bracket that supports an engine or a transmission disposed at a position in front of the first reinforcing member,
   wherein the upper horizontal portion includes a fragile portion a flexural rigidity of which is reduced compared to another portion so as to bend the upper horizontal portion outward in a vehicle width direction at a position between the mount bracket and the first reinforcing member,
   wherein the subframe includes a front attachment at which the subframe is attached to the front subframe support, the front attachment being attached to the front subframe support with a front bolt, and
   wherein the front attachment includes a bolt hole through which the front bolt is inserted and a slit which extends outward in the vehicle width direction from the bolt hole.

7. The vehicle body front structure according to claim 5, wherein a dash cross-member that extends in a vehicle width direction is provided on a rear surface of the dashboard lower, and
   wherein left and right end portions of the dash cross-member are positioned above the respective lower curved portions.

8. The vehicle body front structure according to claim 2, further comprising a rear subframe support that supports the subframe and provided under the third reinforcing member, wherein the rear subframe support includes a high-strength portion and a low-strength portion connected to a lower portion of the high-strength portion, and the low-strength portion having a lower attachment strength with which the low-strength portion is attached than that of the high-strength portion, wherein the low-strength portion is provided with a rear nut, and wherein the subframe is supported by the rear nut and a rear bolt fastened to the rear nut.

9. The vehicle body front structure according to claim 8, further comprising:

an outrigger that is provided adjacent to the rear subframe support and that extends outward in a vehicle width direction from the lower horizontal portion, wherein a side sill extending in the front-rear direction is connected to an end portion of the outrigger in the vehicle width direction.

10. The vehicle body front structure according to claim 3, wherein the inclined portion has a cross sectional height larger than that of the upper horizontal portion.

11. The vehicle body front structure according to claim 7, wherein a third reinforcing member that suppresses bending of the lower curved portion in an up-down direction is provided in the inclined portion opposite to the respective end portions of the dash cross-member.

12. The vehicle body front structure according to claim 6, wherein the upper horizontal portion includes a second fragile portion a flexural rigidity of which is reduced compared to another portion so as to bend the upper horizontal portion inward in the vehicle width direction at a position in front of the mount bracket.

13. A vehicle comprising the vehicle body front structure according to claim 1.

* * * * *